United States Patent
Haines et al.

(10) Patent No.: US 11,189,061 B2
(45) Date of Patent: Nov. 30, 2021

(54) SYSTEMS AND METHODS FOR VIRTUAL FEATURE DEVELOPMENT

(71) Applicant: Universal City Studios LLC, Universal City, CA (US)

(72) Inventors: Stockwell Dudley Haines, Orlando, FL (US); Patrick John Goergen, Orlando, FL (US); Martin Evan Graham, Orlando, FL (US); Thomas Edward Cluff, Orlando, FL (US); Christopher Robert Bromby, Orlando, FL (US); Craig Richard Maras, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 16/908,374

(22) Filed: Jun. 22, 2020

(65) Prior Publication Data

US 2020/0410725 A1   Dec. 31, 2020

Related U.S. Application Data

(60) Provisional application No. 62/866,481, filed on Jun. 25, 2019.

(51) Int. Cl.
*G06T 11/00* (2006.01)
*G06T 13/20* (2011.01)
(Continued)

(52) U.S. Cl.
CPC ........ *G06T 11/001* (2013.01); *G06T 2200/24* (2013.01)

(58) Field of Classification Search
CPC combination set(s) only.
See application file for complete search history.

(56) References Cited

U.S. PATENT DOCUMENTS

| | | |
|---|---|---|
| 7,042,421 B2 | 5/2006 | Hobgood et al. |
| 8,797,321 B1 | 8/2014 | Bertolami et al. |
| | (Continued) | |

OTHER PUBLICATIONS

PCT/US2020/039255 International Search Report and Written Opinion dated Sep. 24, 2020.
(Continued)

*Primary Examiner* — Wesner Sajous
(74) *Attorney, Agent, or Firm* — Fletcher Yoder, P.C.

(57) ABSTRACT

A system for evaluation of an augmented reality (AR) experience provided to a user includes a backdrop, a physical light configured to project light onto the backdrop, and a display system configured to display a virtual feature. A controller is communicatively coupled to the display system and the physical light. The controller is configured to render the virtual feature, receive feedback indicative of an operational parameter of the physical light, and receive additional feedback indicative of a state of a virtual light, where the state of the virtual light defines an appearance of the virtual feature. The controller is configured to adjust the appearance of the virtual feature to an updated appearance based on the feedback indicative of the operational parameter of the physical light, adjust the operational parameter of the physical light based on the additional feedback indicative of the state of the virtual light, or both.

20 Claims, 3 Drawing Sheets

(51) Int. Cl.
*G06T 19/00* (2011.01)
*A63F 13/40* (2014.01)

(56) References Cited

U.S. PATENT DOCUMENTS

| | | |
|---|---|---|
| 9,462,262 B1 | 10/2016 | Worley, III et al. |
| 9,892,562 B2 | 2/2018 | Steed et al. |
| 9,972,132 B2 | 5/2018 | O'Connor et al. |
| 10,146,398 B2 | 12/2018 | Madonna et al. |
| 2007/0236485 A1 | 10/2007 | Trepte |
| 2008/0211813 A1 | 9/2008 | Jamwal et al. |
| 2010/0277468 A1 | 11/2010 | Lefevre et al. |
| 2013/0222369 A1* | 8/2013 | Huston .................. G06T 19/20 345/419 |
| 2016/0364914 A1 | 12/2016 | Todeschini |
| 2018/0053284 A1 | 2/2018 | Rodriguez et al. |
| 2018/0084232 A1* | 3/2018 | Belenkii .............. H04N 13/324 |
| 2018/0236354 A1 | 8/2018 | Van Boven et al. |
| 2019/0196187 A1* | 6/2019 | Kasazumi ............. B60K 35/00 |
| 2019/0227419 A1* | 7/2019 | McNelley .......... G03B 21/2033 |
| 2020/0081530 A1* | 3/2020 | Greenberg ............ G06T 19/006 |

OTHER PUBLICATIONS

Madsen, Claus B. et al., "Real-Time Image-Based Lighting for Outdoor Augmented Reality under Dynamically Changing Illumination Conditions", Aalborg Universitet, Jan. 1, 2006, pp. 364-371.
Bimber, Oliver, et al., "Consistent Illumination within Optical See-Through Augmented Environments", IEEE Computer Society, Oct. 7, 2003, pp. 198-207.
Bingham, M. et al., "Illuminat Condition Matching in Augmented Reality: A Multi-Vision, Interest Point Based Approach", IEEE Computer Society, Aug. 11, 2009, pp. 57-61.

* cited by examiner

SYSTEMS AND METHODS FOR VIRTUAL FEATURE DEVELOPMENT

CROSS-REFERENCE TO RELATED APPLICATIONS

This application claims priority from and the benefit of U.S. Provisional Application Ser. No. 62/866,481, entitled "SYSTEMS AND METHODS FOR VIRTUAL FEATURE DEVELOPMENT," filed Jun. 25, 2019, which is herein incorporated by reference in its entirety for all purposes.

BACKGROUND

Amusement parks and/or theme parks may include various entertainment attractions, restaurants, and rides useful in providing enjoyment to guests (e.g., families and/or people of all ages) of the amusement park. Areas of the amusement park may have different themes that are specifically targeted to certain audiences. For example, certain areas may include themes that are traditionally of interest to children, while other areas may include themes that are traditionally of interest to more mature audiences. Generally, locations having themes associated with such an amusement park may be referred to as an attraction or a themed attraction. It is recognized that it may be desirable to enhance the immersive experience of guests for such attractions by augmenting the themes with virtual features. Unfortunately, it may prove to be difficult and time-consuming to develop the virtual features for various amusement park attractions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for evaluation of an augmented reality (AR) experience provided to a user includes a backdrop, a physical light configured to project light onto the backdrop, and a display system. The display system is configured to display a virtual feature to enable the user to view the virtual feature as being overlaid onto the backdrop. The system also includes a controller communicatively coupled to the display system and to the physical light. The controller is configured to render the virtual feature within a virtual space, receive feedback indicative of an operational parameter of the physical light, and receive additional feedback indicative of a state of a virtual light, where the state of the virtual light defines an appearance of the virtual feature. The controller is also configured to adjust the appearance of the virtual feature to an updated appearance based on the feedback indicative of the operational parameter of the physical light, adjust the operational parameter of the physical light based on the additional feedback indicative of the state of the virtual light, or both.

In one embodiment, a method for evaluation of an augmented reality (AR) experience provided to a user includes overlaying, via a display system, a virtual feature onto a backdrop to enable the user to view the virtual feature overlaid onto the backdrop. The method also includes receiving, from a sensor, feedback indicative of an operational parameter of a physical light configured to illuminate the backdrop and receiving, at a controller, additional feedback indicative of a state of a virtual light, where the state of the virtual light defines an appearance of the virtual feature. The method further includes adjusting, via the controller, the appearance of the virtual feature to an updated appearance based on the feedback indicative of the operational parameter of the physical light, adjusting the operational parameter of the physical light based on the additional feedback indicative of the state of the virtual light, or both.

In one embodiment, an augmented reality (AR) system includes a display system configured to overlay a virtual feature onto an environment viewable by a user, a physical light configured to illuminate the environment, and a controller communicatively coupled to the display system and the physical light. The controller is configured to render the virtual feature within a virtual space having a virtual light, where a state of the virtual light defines an appearance of the virtual feature. The controller is also configured to adjust the state of the virtual light based on feedback indicative of an operational parameter of the physical light and adjust the operational parameter of the physical light based on additional feedback indicative of the state of the virtual light.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR) system that is configured to personalize or otherwise enhance a guest experience of an amusement park attraction by providing the guest with an AR experience. Indeed, combinations of certain hardware configurations, software configurations (e.g., algorithmic structures and/or modeled responses), as well as certain attraction features may be utilized to provide guests with AR experiences that may be customizable, personalized, and interactive.

For example, viewing devices, such as a head mounted display (e.g., electronic goggles or displays, eyeglasses), may be configured to enable amusement park guests or other users to view AR and/or mixed reality scenes. In particular, the head mounted display may be utilized to enhance guest experiences by, for instance, virtually adding or overlaying features in a real-world environment associated with an amusement park, to provide adjustable virtual environments for different experiences in the same amusement park ride, and so forth. Unfortunately, it may be difficult to predict a perceived realism of certain AR features in various real-world environments of the amusement park. In particular, it may be tedious or otherwise time consuming for developers (e.g., design engineers developing the AR features) to evaluate whether the AR system effectively adjusts an appearance (e.g., shading, coloring) of the AR features based on certain lighting conditions of the real-world environment.

Therefore, embodiments of the present disclosure are directed toward a virtual object simulation system, referred to herein as an AR lightbox system, which enables developers to evaluate an appearance of particular AR features in various simulated real-world settings and across a variety of different lighting conditions. Particularly, the AR lightbox system enables developers to evaluate whether an AR system configured to generate the AR features and to overlay the AR features onto a real-world environment (e.g., via the head mounted display) effectively adjusts an appearance of the AR features based on changes in various lighting conditions of the real-world environment. As such, the AR lightbox system may facilitate development of AR features that appear grounded in real-world environments and may facilitate development of algorithms used to overlay such AR features onto the real-world environments, such as themes of an amusement park attraction.

Figure 1:
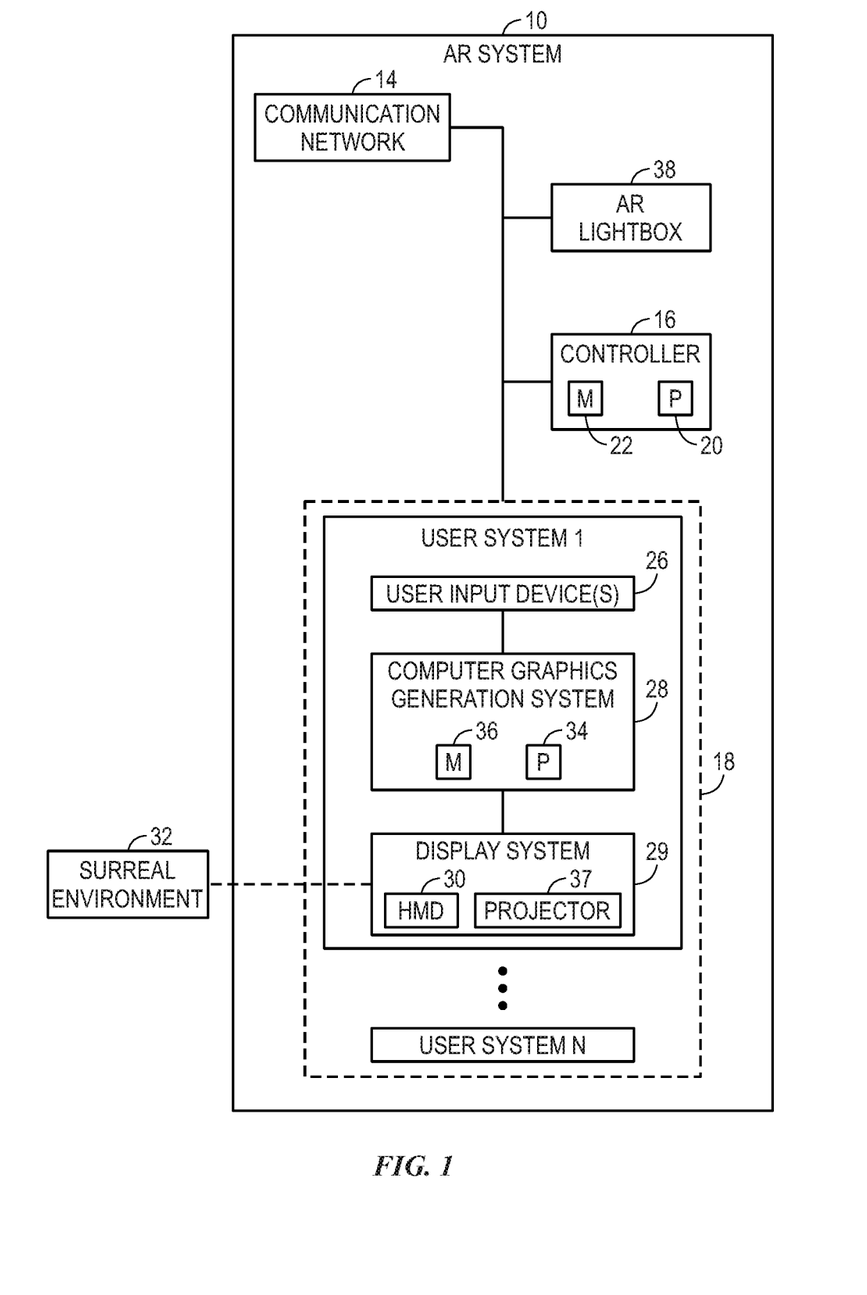
FIG. 1 is a block diagram of an embodiment of an augmented reality (AR) system that may be utilized to overlay virtual features onto a real-world environment, in accordance with present embodiments.

With the foregoing in mind, FIG. 1 is a block diagram an embodiment of an augmented reality (AR) system 10 configured to enable a user (e.g., a guest, an amusement park employee, a passenger of a ride vehicle) to experience (e.g., view, interact with) controlled AR and/or mixed reality scenes. In some embodiments, the AR system 10 may include a communication network 14 (e.g., wired and/or wireless communication network, such as wireless local area networks [WLAN], wireless wide area networks [WWAN], and near field communication [NFC]), a controller 16, and one or more user systems 18 (e.g., game systems). The communication network 14 may include wired or wireless communication components that communicatively couple the controller 16, the one or more user systems 18, and/or any other suitable components of the AR system 10 to one another.

The controller 16 may be a programmable logic controller (PLC) or other suitable control device. The controller 16 may include a processor 20 (e.g., a general-purpose processor, a system-on-chip [SoC] device, an application-specific integrated circuit [ASIC], or some other similar processor configuration) operatively coupled to a memory 22 (e.g., a tangible non-transitory computer-readable medium and/or other storage device) to execute instructions stored in the memory 22. The one or more user systems 18 may be central processing units (CPUs) or other suitable systems. As discussed below, the controller 16 and the one or more user systems 18 may generally be configured to render virtual or augmented graphics for overlay onto real-world environmental views. The one or more user systems 18 may also be responsible for certain game logic and for the placement of certain virtual objects in real space. In certain embodiments, the one or more user systems 18 may be communicatively coupled to one another, thereby enabling multiple users to engage in a shared game (e.g., a game having multiple players). In some embodiments, each of the one or more user systems 18 may include a user input device 26 (e.g., a user interface) or a group of multiple user input devices 26 and a computer graphics generation system 28. The user input device 26 may be communicatively coupled to the computer graphics generation system 28, and the computer graphics generation system 28 may be communicatively coupled to a display system 29 (e.g., via the communication network 14).

As discussed herein, in some embodiments, the display system 29 may include a head mounted display (HMD) 30 that is configured to be worn by the user of the AR system 10 and configured to overlay AR features onto a real-world environment perceived by the user. Accordingly, the head mounted display 30 may enable the user to visualize and perceive a surreal environment 32 (e.g., a game environment), which may include an AR experience, a mixed reality experience, a computer-mediated reality experience, a combination thereof, or other similar surreal environment. That is, the surreal environment 32 may include real-world views and objects that may be augmented (e.g., overlaid) with the AR features. In some embodiments, the user may wear the head mounted display 30 during the duration of a ride (e.g., an amusement park ride) or another predetermined point such as during a game, at the entry of a particular area of an amusement park, during a ride to a hotel associated with the amusement park, at the hotel, and so forth.

The computer graphics generation system 28 may generate and transmit AR graphics to be displayed on the head mounted display 30. In particular, the computer graphics generation system 28 includes processing circuitry, such as a processor 34 (e.g., general purpose processor or other processor) and a memory 36, and may process data useful in generating the surreal environment 32 for the user. The data useful in generating the surreal environment 32 may include, but is not limited to, real-time data received from the respective head mounted display 30, the user input device(s) 26, the controller 16, various sensor data received by the one or more user systems 18, and data stored in the memory 36. In some embodiments, the computer graphics generation system 28 may use such data to generate a frame of reference to coordinate the AR features presented by the head mounted display 30 to the real-world environment surrounding the user.

For example, the computer graphics generation system 28 may selectively generate AR graphics to display on the head mounted display 30 to reflect changes in the user's orientation, position, gaze direction, field of view, motion, and so forth. The computer graphics generation system 28 may also selectively generate the AR graphics to reflect changes in inputs provided by the one or more users using the user input device(s) 26. Furthermore, the computer graphics generation system 28 may generate the AR graphics based on simulated interactions that may cause the AR features to be affected according to certain predetermined or modeled algorithms stored by the computer graphics generation system 28 (e.g., in the memory 36). As an example, the predetermined or modeled algorithms may be implemented by a physics engine or similar module or as a part of the computer graphics generation system 28. In certain embodiments, the computer graphics generation system 28 may track the information or data set forth above corresponding to a plurality of users in a shared game, such that a particular user of the plurality of users in the shared game may see the game effects applied by other users of the plurality of users (e.g., players) in the shared game.

It should be appreciated that the display system 29 may include any other suitable display device and/or projection device that is used in addition to, or in lieu of, the head mounted display 30 to overlay AR features onto a real-world environment perceived by the user. Accordingly, such display devices and/or visualization devices enable the user to visualize and perceive the surreal environment 32 that includes real-world views augmented (e.g., overlaid) with the AR features. As a non-limiting example, the display system 29 may include one or more projectors 37 that are configured to project AR features (e.g., light) directly or indirectly into one eye or both eyes of the user, such that the user may perceive the AR features as overlaid onto the real-world environment viewed by the user. For example, in some embodiments, the one or more projectors 37 may operate as a virtual retinal display that is configured to raster an AR image directly onto the irises and/or retinas of the user's eyes. In certain embodiments, the display system 29 may include any other suitable holographic display or transparent light emitting diode (LED) display. For example, the display system 29 may include a stand-alone transparent display that is separate from the user (e.g., not user-wearable).

In any case, as discussed above, it may be difficult to synchronize certain features (e.g., shading, coloring, reflections) of the AR features with transient environmental conditions (e.g., lighting conditions) of the real-world environment. Indeed, it may be tedious or otherwise time consuming for developers to evaluate a perceived realism of AR features in various environmental settings of an amusement park, hotel, or other area. Accordingly, developers may be unable to effectively adjust the modeled algorithms that may be employed by the computer graphics generation system 28 to render the AR features in a manner that enhances an appearance (e.g., a perceived realism by the user) of the AR features in a particular real-world environment.

Therefore, embodiments of the AR system 10 discussed herein include an AR lightbox system 38 that enables developers, in a testing environment, to efficiently evaluate an appearance of particular AR features in various simulated real-world settings (e.g., themes) and across a variety of different environmental conditions (e.g., natural or artificial lighting conditions). Accordingly, developers may quickly evaluate an appearance (e.g., the perceived realism) of AR features in the various settings, which may facilitate development of the AR features, as well as development of the algorithms used by the computer graphics generation system 28 to control rendering of the AR features and overlay of the AR features onto the real-world environmental views. The AR lightbox system 38 may be communicatively coupled to any suitable component of the AR system 10, such as, for example, to the controller 16 or to the computer graphics generation system 28, and will be discussed in detail below.

Figure 2:
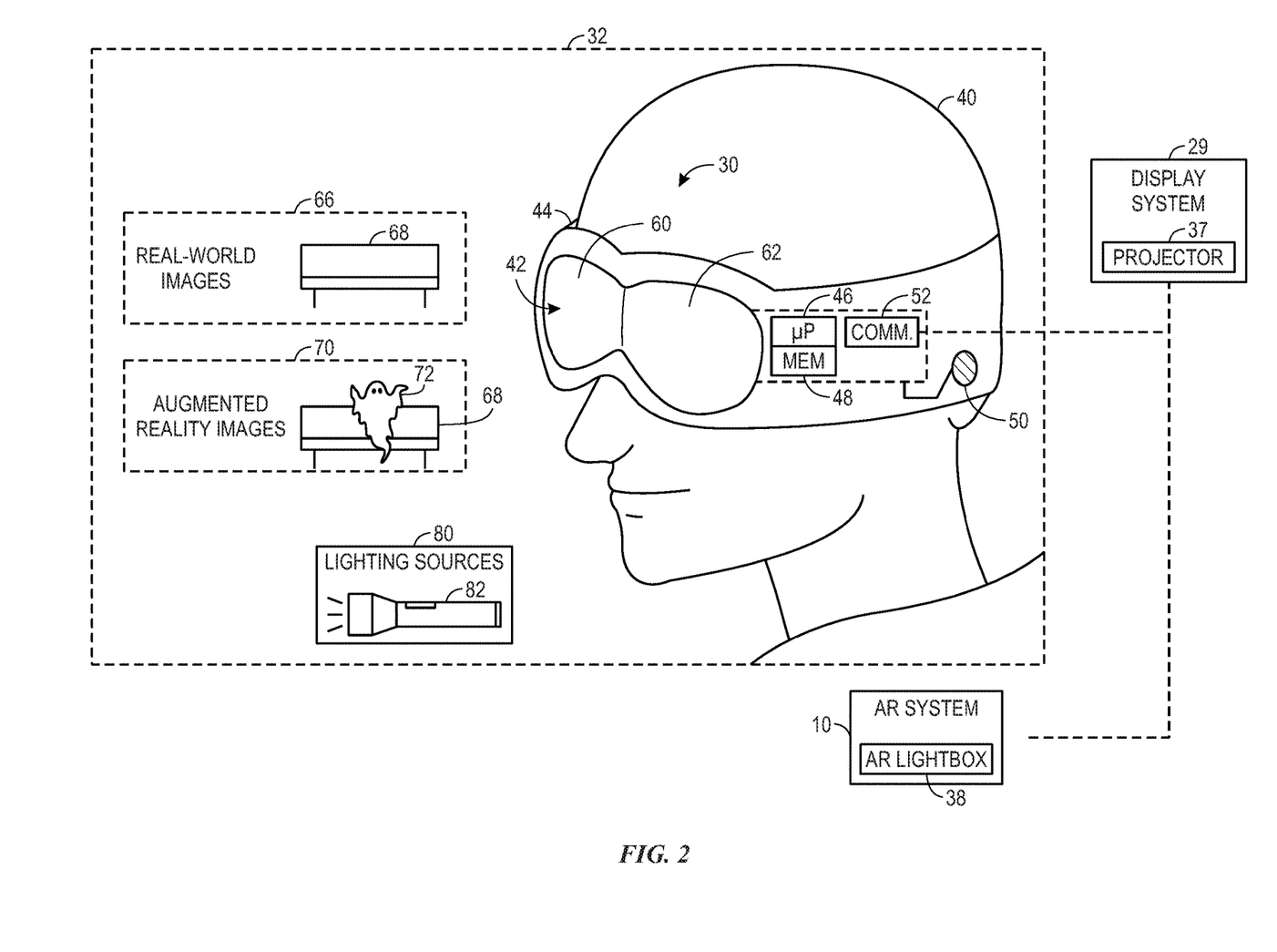
FIG. 2 is an illustration of an embodiment of a head mounted display that may be used in an AR system, in accordance with present embodiments.

FIG. 2 is an illustration of an embodiment of the head mounted display 30 that may be included in the display system 29. The head mounted display 30 may be worn by a user 40, such as a guest of an amusement park, an employee of the amusement park, or a developer of the AR system 10. When implemented in the amusement park setting, the head mounted display 30 may be coupled to (e.g., tethered via a cable or a wire) to a ride vehicle of a passenger ride (e.g., an amusement park attraction). For example, in some embodiments, the user 40 (e.g., a guest) may purchase or otherwise be provided the head mounted display 30 for use within the amusement park setting. The head mounted display 30 may include electronic eyeglasses 42 (e.g., AR eyeglasses, goggles) and a wearable portion 44 configured to house at least a portion of the electronic eyeglasses 42. The head mounted display 30 may be used alone or in combination with other features to create the surreal environment 32. For example, in some embodiments, the head mounted display 30 may be worn by the user 40 throughout the duration of an amusement park ride.

The head mounted display 30 may include a processor 46 and a memory 48 (e.g., a tangible non-transitory computer-readable medium). The processor 46 and the memory 48 may be configured to allow the head mounted display 30 to function as a display (e.g., to receive signals from the computer graphics generation system 28 that ultimately drives the head mounted display 30). The processor 46 may be a general-purpose processor, system-on-chip (SoC) device, an application-specific integrated circuit (ASIC), or some other similar processor configuration.

The head mounted display 30 may include a tracking system 50 that may include orientation and/or position sensors, such as accelerometers, magnetometers, gyroscopes, GPS receivers, motion tracking sensors, electromagnetic and solid-state motion tracking sensors, inertial measurement units (IMUs), presence sensors, or other sensors. The tracking system 50 may collect real-time data indicative of the user's 40 position, orientation, focal length, gaze direction, field of view, motion, or any combination thereof. The head mounted display 30 may include a communication interface 52 (e.g., including a wireless transceiver) that may transmit the real-time data captured via the tracking system 50 to the processor 46 and/or the computer graphics generation system 28 for processing. The communication interface 52 may also allow the head mounted display 30 to receive the display signal transmitted by the computer graphics generation system 28.

In some embodiments, the electronic eyeglasses 42 may include a pair of displays 60 and 62 respectively corresponding to each eye of the user 40. In some embodiments, a unified display may be employed in lieu of the pair of displays 60, 62. The displays 60, 62 may each include, by way of non-limiting example, a liquid crystal display (LCD), an organic light emitting diode (OLED) display, or other similar display or transparent screen that enables the user 40 to view real-world images 66 of the actual, physical environment (e.g., the real-world environment) surrounding the user 40. In certain embodiments, the displays 60, 62 may each include a transparent (e.g., see-through) LED display or a transparent (e.g., see-through) OLED display that enable the user 40 to view real-world objects 68 (e.g., physical objects such as a seating bench) within the physical or real-world environment. In other words, the real-world images 66 generally represent what the user 40 would see even when not wearing the head mounted display 30.

The electronic eyeglasses 42 may include features (e.g., circuitry, light emitters) that enable the displays 60, 62 to overlay augmented reality images 70 onto the real-world images 66 viewed by the user 40. That is, in some embodiments, the light emitters may project one or more virtual features onto the displays 60, 62, such that the virtual features are reflected off the displays 60, 62 and into the eyes of the user 40. Thus, the head mounted display 30 may enable the user 40 to view the physical environment through a substantially transparent set of the electronic eyeglasses 42 with certain virtual features overlaid onto a surface of the electronic eyeglasses 42. Accordingly, the user 40 may perceive that the virtual features are integrated into the physical environment. In this manner, in wearing the head mounted display 30, the user 40 may feel completely encompassed by the surreal environment 32 such that the user 40 may perceive the surreal environment 32 to be the real-world physical environment that includes certain virtual features. Indeed, the head mounted display 30 may at least partially control a view of the user 40 such that the surreal environment 32 is the actual physical environment (e.g., the real-world images 66) with the augmented reality images 70 overlaid onto the physical environment.

For example, the displays 60, 62 may overlay a virtual object 72 or virtual feature (e.g., a ghost) onto the real-world object 68 (e.g., the seating bench), thereby creating the illusion that the virtual object 72 is physically present in the real-world environment and interacting with the real-world object 68 (e.g., the head mounted display 30 may create the illusion that the ghost is seated on the seating bench). In some embodiments, the augmented reality images 70 may also function to overlay the real-world object 68 so that the real-world object 68 appears deleted or no longer present (e.g., the real-world object 68 is fully or partially occluded with the virtual object 72 or a virtual environmental representation).

As noted above, in some embodiments, the display system 29 may include the one or more projectors 37 instead of the head mounted display 30. In such embodiments, the one or more projectors 37 may be configured to project the augmented reality images 70 directly into the eyes of the user 40 (e.g., without the user 40 viewing the physical environment through a display) to enable the user 40 to perceive the virtual object 72 overlaid onto the real world object 68 of the physical environment. In certain embodiments, the display system 29 may include a stand-alone transparent display (e.g., a liquid crystal display (LCD), an organic light emitting diode (OLED) display, or other similar display) that is separate from the user 40 (e.g., not worn by the user 40) and positioned within the physical environment. The stand-alone transparent display may be configured to overlay the augmented reality images 70 onto the real-world images 66 in a manner that is similar to the techniques discussed above with respect to the electronic eyeglasses 42. Accordingly, when viewing the physical environment through the stand-alone transparent display, the user 40 may view the real-world images 66 having the augmented reality images 70 overlaid thereon.

In some embodiments, the real-world environment may include various lighting sources 80 (e.g., incident sunlight, user operated flashlights or laser pointers) that may illuminate the physical objects present in the real-world environment. As an example, in some embodiments, the user 40 may be provided with a lighting device 82 (e.g., a flashlight, a laser pointer) as part of an amusement park attraction. The lighting device 82 may include the user input device 26 or may include a portion of the user input device 26. The user 40 may use the lighting device 82 to selectively illuminate certain real-world objects 68 (e.g., the seating bench) surrounding the user 40 (e.g., as part of a game associated with the amusement park attraction). Accordingly, the user 40 may perceive the user-selectively illuminated sections of the real-world environment through the electronic eyeglasses 42. If the user 40 directs the flashlight toward and/or onto the virtual object 72 (e.g., the ghost), it may be desirable to update an appearance (e.g., a shadowing effect, a color, a reflection) of the virtual object 72 to generate the illusion that the lighting device 82 illuminates the virtual object 72. As discussed below, the AR lightbox system 38 enables developers to effectively update, modify, and/or otherwise adjust modeling algorithms that may be implemented by the AR system 10 to adjust the appearance of the virtual object 72 in response to such lighting inputs, thereby enhancing a perceived realism of the virtual object 72. Indeed, such synchronization between adjustments in an appearance of the virtual object and real-world lighting conditions may enhance an illusion that the virtual object 72 is physically present in the real-world environment.

Figure 3:
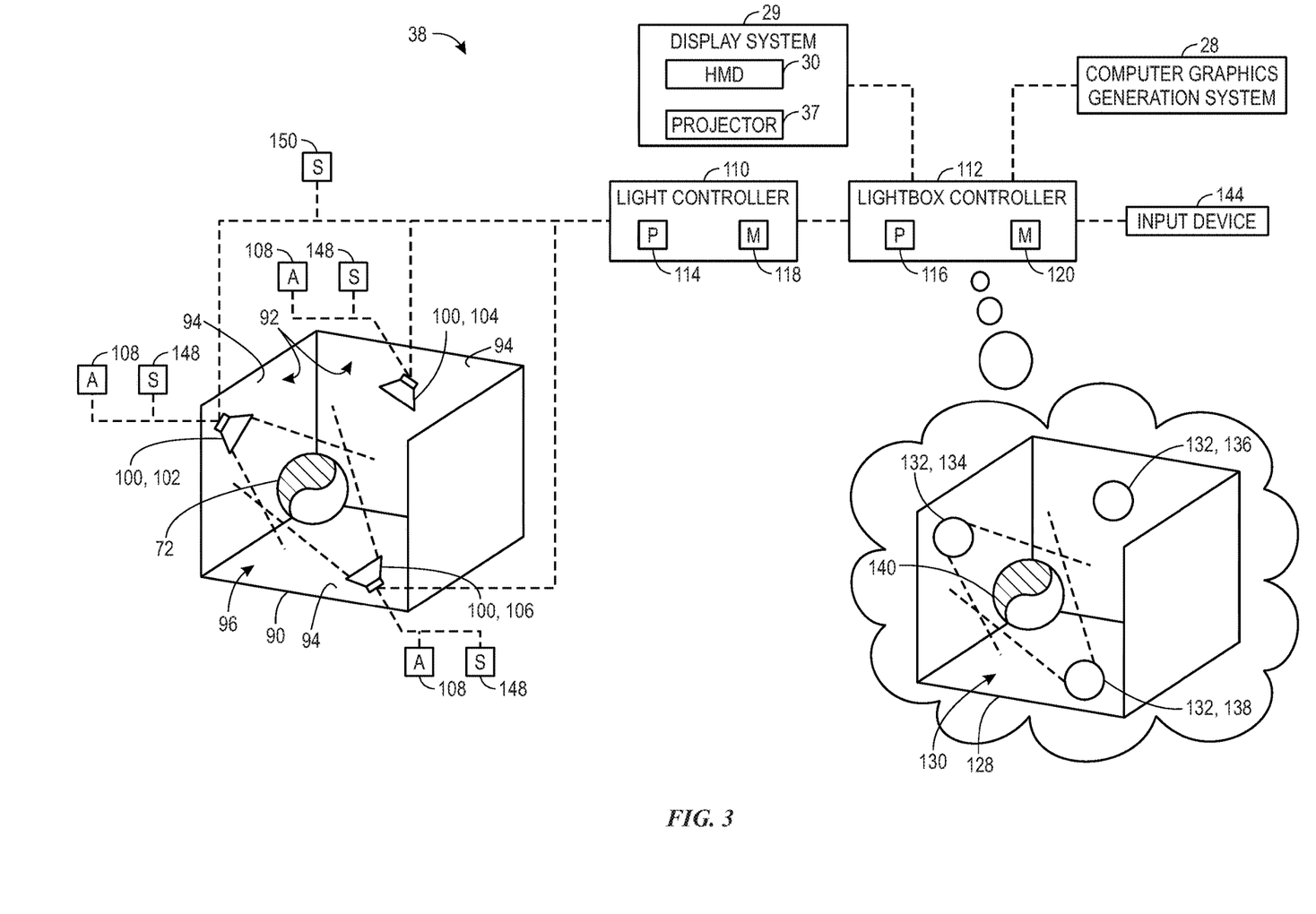
FIG. 3 is an illustration of an embodiment of an augmented reality (AR) lightbox system that may be used in an AR system, in accordance with present embodiments.

To facilitate the following discussion, FIG. 3 is a schematic of an embodiment of the AR lightbox system 38. As briefly discussed above, the AR lightbox system 38 enables a developer to evaluate a perceived realism of the virtual object 72 when rendered in a real-world environment that is exposed to various lighting conditions. In particular, the AR lightbox system 38 may provide a testing environment that is configured to recreate certain real-world lighting conditions expected to occur throughout the duration of an amusement park ride or another attraction in which the virtual object 72 is to be implemented. Accordingly, the developer may evaluate whether the computer graphics generation system 28 is appropriately configured to present the virtual object 72 in a realistically appearing manner in such lighting conditions. Indeed, the AR lightbox system 38 may enable developers to quickly modify, update, and/or adjust modeling algorithms employed to generate the virtual object 72 (e.g., via the computer graphics generation system 28) upon evaluation and inspection of the virtual object 72 in the various lighting conditions simulated in the testing environment of the AR lightbox system 38. Accordingly, the developer may tailor the modeling algorithms of the computer graphics generation system 28 to better present (e.g., render) the virtual object 72 in various real-world environments and/or to better update an appearance of the virtual object 72 in such real-world environments in response to transient lighting conditions, thereby enhancing a perceived realism of the virtual object 72 in these environments. Moreover, the AR lightbox system 38 may enable the developer to derive such modifications to the modeling algorithms without involving empirical tests at the amusement park attraction in which the AR system 10 is to be implemented.

For example, in the illustrated embodiment, the AR lightbox system 38 includes a physical stage 90 (e.g., an environment) having a backdrop 92 defined by one or more interior walls 94. Accordingly, the physical stage 90 defines a physical space 96 within the real-world environment. For clarity, it should be understood that the physical stage 90 may include any suitable platform, surface, wall, panel, or combination thereof, which defines the physical space 96 or a portion of the physical space 96. As discussed below, the display system 29 (e.g., the head mounted display 30, the one or more projectors 37) may be configured to overlay the virtual object 72 onto the backdrop 92 to enable the user 40 (e.g., a developer) using the display system 29 to perceive the virtual object 72 as positioned within the physical space 96. The AR lightbox system 38 includes one or more physical lights 100 that may be individually operable to illuminate certain portions of the physical stage 90. Specifically, in the illustrated embodiment, the AR lightbox system 38 includes a first physical light 102, a second physical light 104, and a third physical light 106. For clarity, as used herein, a "physical light" refers to a suitable lighting device that is located within the real-world environment and is configured to illuminate real-world objects within the real-world environment, such as the physical stage 90. As a non-limiting example, such physical lights may include incandescent light bulbs, compact fluorescent lamps, halogen lamps, neon lamps, light-emitting diodes (LEDs), flashlights (e.g., user-operable flashlights and/or flashlights controllable via one or more actuators), or any other suitable lighting devices. It should be noted that the physical lights 100 may be positioned within the physical space 96 defined by the physical stage 90 or may be positioned exterior to the physical space 96. For example, in certain embodiments, the physical lights 100 may be positioned adjacent to the physical stage 90 and configured to project light into the physical space 96 and onto the backdrop 92.

In certain embodiments, the backdrop 92 may include various themes, designs, and/or other graphics that are displayed on the backdrop 92 and/or integrated with the backdrop 92. For example, in some embodiments, various graphics may be painted or drawn onto the backdrop 92 to simulate a particular environment (e.g., space theme, jungle theme) in which the virtual object 72 is to be displayed when presented in an attraction. In certain embodiments, various graphics may be projected onto the backdrop 92 via a projection system, such that the graphics are overlaid onto a surface of the backdrop 92. In further embodiments, portions of or substantially all of the backdrop 92 may include one or more displays configured to display various static images or video feeds. As an example, the one or more displays may include liquid crystal displays (LCDs), organic light emitting diode (OLED) displays, LED displays, or other suitable displays for displaying image data. As discussed below, it should be appreciated that the backdrop 92 may include one or more walls, a floor, and/or a ceiling of a room, such that the user 40 may traverse (e.g., walk across) the room while wearing the head mounted display 30 and utilizing the AR lightbox system 38 in accordance with the techniques discussed herein.

In some embodiments, one or more of the physical lights 100 may be selectively controllable to output particular colors (e.g., wavelengths) of visible light. As an example, a certain number/quantity of the physical lights 100 may include controllable LEDs that are operable to selectively project various color of light onto the backdrop 92. In certain embodiments, the physical lights 100 may be configured to adjust an intensity (e.g., a luminous intensity) of the light via internal control circuitry. In some embodiments, one or more physical adjustment devices may be used to adjust a color of the light and/or an intensity of the light that is output by the physical lights 100 in addition to, or in lieu of, integrated control circuitry that may be included in the physical lights 100. For example, the physical lights 100 may be associated with respective colored gels that may be selectively placed in front of the physical lights 100 to adjust a color of light that is output by the physical lights 100. Moreover, the physical lights 100 may be associated with respective shutters that are configured to adjust an intensity of the light that is output by the physical lights 100.

In some embodiments, certain of the physical lights 100 may be coupled to respective actuators 108 that may be operable to adjust an orientation and/or a location of the physical lights 100 relative to the physical stage 90. For example, the actuators 108 may be configured to adjust an angle at which the physical lights 100 direct light onto particular portions of the physical stage 90. Additionally or alternatively, the actuators 108 may adjust a separation distance between the physical lights 100 and the physical stage 90 and/or may move the physical lights 100 relative to the physical stage 90. The actuators 108 may include, for example, linear actuators, pneumatic actuators, electro-mechanical actuators, or other suitable actuators. As such, it should be understood that the actuators 108 may be configured to impart rotational motion, linear movement, and/or other movement to one or more of the physical lights 100.

The physical lights 100 and the actuators 108 may be communicatively coupled (e.g., via wired or wireless communication components) to a light controller 110 or to another suitable control device of the AR lightbox system 38. As discussed below, the light controller 110 may be configured to instruct the physical lights 100 to adjust an intensity of light and/or a color of light that is output by each of the physical lights 100. Moreover, the light controller 110 may be configured to instruct the actuators 108 to adjust an orientation and/or a position of the physical lights 100 relative to the physical stage 90.

The light controller 110 may be communicatively coupled to a lightbox controller 112 of the AR lightbox system 38, which may be used to control the various components of the AR lightbox system 38. In some embodiments, the lightbox controller 112 may include the computer graphics generation system 28 or may be integrated with the computer graphics generation system 28. In other embodiments, the lightbox controller 112 may include a controller that is separate from the computer graphics generation system 28 and configured to receive information from or to send information to the computer graphics generation system 28. For example, in some embodiments, the computer graphics generation system 28 may provide the lightbox controller 112 with instructions (e.g., modeling algorithms) that enable the lightbox controller 112 to render and display virtual features via the display system 29 (e.g., via the head mounted display 30 and/or the one or more projectors 37). It should be appreciated that the light controller 110 and the lightbox controller 112 may each include respective processors 114, 116 and respective memories 118, 120 (e.g., tangible non-transitory computer-readable mediums) that enable the light controller 110 and the lightbox controller 112 to execute the techniques and processes discussed herein.

The lightbox controller 112 may be configured to generate (e.g., render) a virtual stage 128 that is a virtual representation of the physical stage 90. The virtual stage 128 may define a virtual space 130 (e.g., a game space) that is configured match a size and/or a scale of the physical space 96. In other words, the lightbox controller 112 may ensure that relative dimensions of the virtual stage 128 are proportional to or equal to relative dimensions of the physical stage 90. In some embodiments, the lightbox controller 112 may not render the virtual stage 128 as a digital representation and, instead, may utilize the virtual stage 128 to define exterior dimensional boundaries of the virtual space 130. The virtual space 130 may include one or more virtual lights 132 that are each associated with a respective one of the physical lights 100. Particularly, in the illustrated embodiment, the virtual space 130 includes a first virtual light 134, a second virtual light 136, and a third virtual light 138 that are respectively associated with the first physical light 102, the second physical light 104, and the third physical light 106. For clarity, as used herein, a "virtual light" may refer to a light simulation that is configured to update representations of virtual lighting within the virtual space 130. It should be understood that, although the illustrated embodiment of the AR lightbox system 38 includes three physical lights 100 and three virtual lights 132, in other embodiments, the AR lightbox system 38 may include any suitable quantity of physical lights 100 and corresponding virtual lights 132.

The virtual space 130 may include a representation 140 of the virtual object 72. The representation 140 may be a model (e.g., a digital representation) of the virtual object 72. Particularly, the lightbox controller 112 may be configured to provide the representation 140 to the display system 29 as an input that enables the display system 29 to overlay the virtual object 72 onto a suitable real-world environment in accordance with the techniques discussed above. In other words, in some embodiments, the virtual object 72 may be a rendering of the representation 140 generated by the lightbox controller 112. As discussed in detail herein, the lightbox controller 112 may be configured to update an appearance (e.g., coloring, shading) of the representation 140 based on changes in the lighting conditions of the physical space 96, as well as changes in the lighting conditions of the virtual space 130. As a result, changes in the appearance of the representation 140 may be reflected as changes in the appearance of the virtual object 72 (e.g., the rendering of the virtual object 72 may be updated in accordance with the representation 140).

To evaluate an appearance of the virtual object 72 in a particular lighting environment, a developer may, via an input device 144 (e.g., the user input device 26), instruct the lightbox controller 112 to overlay the virtual object 72 onto the backdrop 92 using the display system 29. The physical lights 100 may be configured to simulate particular real-world lighting conditions in the physical space 96, which may be specified by the developer. For example, the developer may instruct (e.g., via inputs provided to the lightbox controller 112) the physical lights 100 to simulate lighting conditions that are expected to occur throughout the duration of a particular amusement park ride. Each of the physical lights 100 may be configured to provide the light controller 110 with feedback indicative of current operational parameters of that particular physical light 100. As an example, such operational parameters may include an identifier associated with each of the physical lights 100 (e.g., an identification code used to differentiate the first physical light 102, the second physical light 104, and the third physical light 106), a light intensity output by each of the physical lights 100, a color (e.g., a hue) of light output by each of the physical lights 100, a location of each of the physical lights 100 relative to the physical stage 90, an orientation of each of the physical lights relative to the physical stage 90, or a combination thereof. In certain embodiments, the physical lights 100 may include sensors (e.g., integrated sensors) configured to provide the light controller 110 with feedback indicative of any one or combination of the aforementioned operational parameters. Additionally or alternatively, the physical lights 100 may be associated with respective sensors 148 (e.g., external sensors) that are configured to provide the light controller 110 with feedback indicative of such operational parameters. For example, in some embodiments, the sensors 148 may include optical sensors (e.g., light intensity sensors, wavelength detectors), GPS sensors, photoelectric sensors, or other suitable sensors.

In certain embodiments, some of the physical lights 100 and the corresponding actuators 108 may be configured to execute a particular lighting sequence (e.g., a predetermined lighting sequence) that temporally defines positions, orientations, lighting hues, lighting intensities, and/or other parameters of the physical lights 100. The lighting sequence may be initiated upon a particular operator input (e.g., a user providing input to a user interface coupled to the lightbox controller 112) and/or sensor feedback (e.g., a user moving toward a particular location relative to the physical stage 92). Lighting sequences associated with the physical lights 100 may be stored in, for example, the respective memories 118, 120 of the light controller 110 and/or the lightbox controller 112. Additionally or alternatively, the lighting sequences may be stored in associated memories (e.g., integrated memories) of the physical lights 100. In any case, upon initiation of a particular lighting sequence, one or more of the physical lights 100 may provide the lightbox controller 112 with feedback indicative of the current operational parameters of the physical lights 100 during execution of the corresponding lighting sequences. That is, the lightbox controller 112 may, instead of receiving feedback from the sensors 148 indicative of the operational parameters of the physical lights 100, receive feedback indicative of the current operational parameters of the physical lights 100 directly from corresponding controllers of the physicals lights 100 that are configured to execute the lighting sequences.

In some embodiments, the AR lightbox system 38 may include one or more ambient lighting sensors 150 that are configured to provide the light controller 110 with feedback (e.g., ambient lighting feedback) indicative of ambient lighting surrounding the physical stage 90. As a non-limiting example, the one or more ambient lighting sensors 150 may be configured to provide the light controller 110 with feedback indicative of natural sunlight projected onto the physical stage 90 or of simulated sunlight which may be projected onto the physical stage 90 from additional lighting devices positioned above the physical stage 90. In certain embodiments, some of the one or more ambient lighting sensors 150 may be coupled to an actuated manipulator (e.g., a robotic manipulator) that is configured to adjust a position of the ambient lighting sensors 150 relative to the physical stage 90. Accordingly, the actuated manipulator may enable the one or more ambient lighting sensors 150 to acquire feedback indicative of ambient lighting conditions at various locations along the physical stage 90. The actuated manipulator may be communicatively coupled to the lightbox controller 112, thereby enabling the lightbox controller 112 to send instructions to adjust a position of the one or more ambient lighting sensors 150 via the actuated manipulator. In some embodiments, the display system 29 may be configured to overlay the actuated manipulator with an AR feature so that the actuated manipulator appears deleted or no longer present to a developer (e.g., the user 40) viewing the physical stage 90 through the display system 29 (e.g., the display system 29 may fully or partially occlude the actuated manipulator with a virtual environmental representation).

The light controller 110 may provide the lightbox controller 112 with information indicative of the feedback received from the physical lights 100 and/or the feedback received from the sensors 148 and/or the ambient lighting sensors 150. It should be appreciated that, in certain embodiments, the physical lights 100, the sensors 148, and/or the ambient lighting sensors 150 may provide such feedback directly to the lightbox controller 112. Indeed, in such embodiments, the light controller 110 may be omitted from the AR lightbox system 38. In any case, the lightbox controller 112 may update the virtual lighting conditions (e.g., respective states of the virtual lights 132) within the virtual space 130 based on the feedback provided by the physical lights 100, feedback provided by the sensors 148, and/or feedback provided by the ambient lighting sensors 150. For example, the lightbox controller 112 may update a location and/or an orientation of each of the virtual lights 132 within the virtual space 130 based on a determined location and/or a determined orientation of the corresponding physical lights 100 within the physical space 96. Particularly, the lightbox controller 112 may adjust locational parameters (e.g., position, orientation) of the virtual lights 132, relative to the virtual space 130, to match the locational parameters (e.g., position, orientation) of the physical lights 100, relative to the physical space 96. Moreover, the lightbox controller 112 may update a color and/or an intensity of the virtual lighting rendered onto the representation 140 based on the current color and/or intensity of light projected by the physical lights 100.

As a non-limiting example, the lightbox controller 112 may be configured to directly or indirectly receive feedback from the first physical light 102 indicative of an operational parameter, or a plurality of operational parameters, of the first physical light 102, such as a position of the first physical light 102 (e.g., relative to the physical stage 90), an orientation of the first physical light 102 (e.g., relative to the physical stage 90), a hue (e.g., a color) of light output by the first physical light 102, and/or an intensity (e.g., a luminous intensity) of light output by the first physical light 102. Upon receiving such feedback, the lightbox controller 112 may be configured to update a state of the first virtual light 134 to match the corresponding operational parameter or parameters of the first physical light 102. That is, the lightbox controller 112 may adjust a position and/or an orientation of the first virtual light 134 (e.g., relative to the virtual stage 128) within the virtual space 130 to match the current position and the current orientation of the first physical light 102 (e.g., relative to the physical stage 90) in the physical space 96. Accordingly, the lightbox controller 112 may adjust an angle at which virtual light is rendered onto the representation 140 based on a position and/or an orientation of the first physical light 102 within the physical space 96. The lightbox controller 112 may also adjust a hue and an intensity of virtual light rendered by the first virtual light 134 to match the hue and the intensity of light output by the first physical light 102. Accordingly, the lightbox controller 112 may adjust the color and the intensity of the virtual light rendered onto the representation 140 to the color and intensity of light output by the first physical light 102. In other words, by adjusting a state of the first virtual light 134 (e.g., based on the operational parameter of the first physical light 102), the lightbox controller 112 may adjust (e.g., update) an appearance of the virtual object 72.

The lightbox controller 112 may adjust the virtual light rendered by the second virtual light 136 and the third virtual light 138 based on the lighting output of the second physical light 104 and the third physical light 106, respectively, in accordance with the aforementioned techniques. That is, the lightbox controller 112 may adjust the virtual light rendered by the second and third virtual lights 136, 138 based on feedback from integrated sensors within the second and third physical lights 104, 106, respectively, and/or feedback from the sensors 148 (e.g., sensors external to the second and third physical lights 104, 106). In this manner, the lightbox controller 112 may adjust a rendered appearance (e.g., shading, highlighting, coloring) of the representation 140, and thus, adjust a rendered appearance of the virtual object 72, based on the operational parameters of the physical lights 100. Indeed, the lightbox controller 112 may execute the aforementioned techniques in substantially real-time to adjust an appearance the virtual object 72 in response to changes in the operational parameters (e.g., position, orientation, hue, intensity) of the physical lights 100 in the physical space 96. The AR lightbox system 38 thereby enables a developer to evaluate whether the rendered appearance of the virtual object 72 appears realistically commensurate with the lighting conditions generated by the physical lights 100. In other words, the developer may determine whether the computer graphics generation system 28 adequately adjusts the appearance of the virtual object 72 in response to changes in lighting output by the physical lights 100.

As an example, the developer may determine whether the lightbox controller 112 adjusts a shading and/or a shadowing of the virtual object 72 in a spatially and/or temporally realistic manner when one or more of the physical lights 100 are moved relative to the physical stage 90 and/or are instructed to output a different hue or intensity of light. Indeed, the developer may use the AR lightbox system 38 to simulate various real-world lighting conditions (e.g., via the physical lights 100) that may occur, for example, throughout the duration of a particular amusement park ride, and evaluate a realism of the transiently adjusting appearance of the virtual object 72 in response to such changes in the real-world lighting conditions. Accordingly, the developer may, in a testing environment having the AR lightbox system 38, predict how a virtual object will appear in a particular setting of the amusement park. Therefore, the AR lightbox system 38 may enable the developer to make adjustments to the algorithms used to update the appearance of the virtual object 72 upon a determination that the currently employed algorithms adjust the appearance of the virtual object 72 in an unrealistic or inadequate manner. As such, the AR lightbox system 38 enables a developer to better tailor the modeling algorithms of the lightbox controller 112 and/or of the computer graphics generation system 28 in a manner that enables the lightbox controller 112 and/or the computer graphics generation system 28 to more effectively generate an illusion that light output by the physical lights 100 interacts with (e.g., reflects off of, changes a coloration or shading of) the virtual object 72. It should be appreciated that the lightbox controller 112 may adjust the light rendered by any of the first, second, and/or third virtual lights 134, 136, 138 based on the ambient lighting feedback provided by the ambient lighting sensors 150. As such, the lightbox controller 112 may adjust an appearance of the virtual object 72 based on ambient lighting conditions surrounding the backdrop 92 of the physical stage 90.

In some embodiments, the AR lightbox system 38 may be configured to adjust operational parameters (e.g., a position and/or orientation of the physical lights 100 relative to the physical stage 90, a hue and/or intensity of light output by the physical lights 100) of the physical lights 100 based on operational states (e.g., a position and/or orientation of the virtual lights 132 relative to the virtual stage 128, a hue and/or intensity of virtual light rendered by the virtual lights 132) of the virtual lights 132 in addition to, or in lieu of, adjusting operational states of the virtual lights 132 based on operational parameters of the physical lights 100. For example, the developer may instruct the lightbox controller 112 to adjust the operational states of the virtual lights 132 via instructions provided through the input device 144. In particular, using the input device 144, the developer may adjust a position of the first virtual light 134 (e.g., relative to the virtual stage 128), adjust an orientation of the first virtual light 134 (e.g., relative to the virtual stage 128), adjust a hue (e.g., a color) of virtual light rendered by the first virtual light 134, and/or adjust an intensity of virtual light rendered by the first virtual light 134. Such instructions may be used to simulate possible user inputs that may be provided by a user during a game generated by the computer graphics generation system 28, such as a game presented as part of an amusement park attraction. Upon receiving such instructions, the lightbox controller 112 may adjust the appearance of the representation 140 and the appearance of the virtual object 72 in accordance with the techniques discussed above. Substantially in conjunction with adjusting the appearance of the virtual object 72, the lightbox controller 112 may adjust a position and/or an orientation (e.g., via the corresponding actuators 108) of the first physical light 102 in the physical space 96 (e.g., relative of the physical stage 90) to match the current position and orientation (e.g., state) of the first virtual light 134 in the virtual space 130 (e.g., relative to the virtual stage 128). Additionally, the lightbox controller 112 may adjust the hue and/or intensity of light output by the first physical light 102 to match the hue and intensity (e.g., state) of virtual light rendered by the first virtual light 134. It should be understood that the lightbox controller 112 may adjust the operational parameters of the second physical light 104 and the third physical light 106 based on the states of the second virtual light 136 and the third virtual light 138, respectively, in accordance with these techniques.

In this manner, the lightbox controller 112 may adjust the operational parameters of the physical lights 100 based on the updated appearance of the virtual object 72 (e.g., as defined by the manipulation of the virtual lights 132). The lightbox controller 112 may adjust the operational parameters (e.g., position, orientation, hue, intensity) of the physical lights 100 in substantially real-time to the specified adjustments in the appearance of the virtual object 72, thereby enabling a developer to evaluate whether the physical lights 100 adjust their lighting output in a manner that is synchronous and realistically commensurate with the adjusted appearance of the virtual object 72. Therefore, the AR lightbox system 38 may enable the developer to make adjustments to the algorithms used to control operation of the physical lights 100 upon a determination that the currently employed algorithms adjust the operation of the physical lights 100 in an unrealistic manner (e.g., in relation to adjustment of the appearance of the virtual object 72).

In certain embodiments, the lightbox controller 112 may be configured to determine occurrence of a fault condition of one or more of the physical lights 100. For example, the lightbox controller 112 may determine whether one or more of the physical lights 100 are operating ineffectively or are inoperative (e.g., due to failure of a filament within the light). Upon detection of such a fault condition, the lightbox controller 112 may provide a notification (e.g., via a suitable display device, such as the head mounted display 30, an audible alert) to the developer that prompts the developer to perform maintenance on (e.g., replace, repair) one or more of the physical lights 100. In certain embodiments, the identifiers associated with each of the physical lights 100 may enable the lightbox controller 112 to inform the developer as to which of the physicals lights 100 (e.g., the first physical light 102, the second physical light 104, the third physical light 106), in particular, is incurring the fault condition. For example, via display of the identifiers, the lightbox controller 112 may inform the developer of a location of the particular physical light exhibiting the fault condition (e.g., in response to detection of the occurrence of the fault condition).

In some embodiments, the AR lightbox system 38 may be a portable kit that is configured to be easily transferred to various testing locations or settings. For example, the physical stage 90 may be sized for placement on a desk or other suitable structure. The light controller 110 and the lightbox controller 112 may also be housed in a portable structure and configured to communicatively couple to the components of the physical stage 90, such as the physical lights 100, the sensors 148, 150, and/or the actuators 108. In some embodiments, the light controller 110, the lightbox controller 112, and/or other features included in the AR lightbox system 38 may be integrated within a suitable portion of the physical stage 90. It should be appreciated that, in other embodiments, the physical stage 90 may be scaled to any suitable size. For example, in some embodiments, the physical stage 90 may be sized to enable the developer to stand on and/or travel across the physical stage 90 to view the virtual object 72 from various perspectives (e.g., relative to the physical stage 90). Moreover, certain props (e.g., animatronic figures, theatre props, other objects) may be placed on the physical stage 90 to enable developers to evaluate appearances of the virtual object 72 with respect to the props on the physical stage 90. In some embodiments, the physical stage 90 includes a room having the features (e.g., backdrop 92, physical lights 100, actuators 108, etc.) of the physical stage 90 discussed above. As such, users (e.g., developers, guests of an amusement park attraction) may utilize the AR lightbox system 38 in accordance with the techniques discussed above to view virtual objects in various real-word settings.

As set forth above, embodiments of the present disclosure may provide one or more technical effects useful for evaluating appearances of AR features in various simulated real-world settings and across a variety of different lighting conditions. Particularly, the AR lightbox system discussed herein may enable developers or other users to more effectively develop AR features that appear grounded in real-world environments and develop algorithms used to overlay such AR features onto the real-world environments. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A system for evaluation of an augmented reality (AR) experience provided to a user, the system comprising:
   a backdrop;
   a physical light configured to project light onto the backdrop;
   a display system configured to display a virtual feature to enable the user to view the virtual feature as being overlaid onto the backdrop; and
   a controller communicatively coupled to the display system and the physical light, wherein the controller is configured to:
      render the virtual feature within a virtual space;
      receive feedback indicative of an operational parameter of the physical light;
      receive additional feedback indicative of a state of a virtual light, wherein the state of the virtual light defines an appearance of the virtual feature; and
      adjust the appearance of the virtual feature to an updated appearance based on the feedback indicative of the operational parameter of the physical light, adjust the operational parameter of the physical light based on the additional feedback indicative of the state of the virtual light, or both.

2. The system of claim 1, comprising a physical light sensor configured to provide the controller with the feedback indicative of the operational parameter of the physical light, wherein the operational parameter includes a position of the physical light relative to the backdrop, an orientation of the physical light relative to the backdrop, a hue of the light projected onto the backdrop, an intensity of the light projected onto the backdrop, or a combination thereof.

3. The system of claim 1, comprising an actuator coupled to the physical light and configured to adjust the operational parameter of the physical light, wherein the controller is configured to instruct the actuator to adjust the operational parameter of the physical light in response to receiving the additional feedback indicative of the state of the virtual light.

4. The system of claim 3, wherein the operational parameter includes a position of the physical light relative to the backdrop, an orientation of the physical light relative to the backdrop, or both.

5. The system of claim 1, comprising a user input device communicatively coupled to the controller and configured to enable the user to provide the additional feedback indicative of the state of the virtual light to the controller.

6. The system of claim 5, wherein the controller is configured to render a virtual stage in the virtual space, wherein the virtual stage corresponds to a physical stage having the backdrop, wherein the state of the virtual light includes a position of the virtual light relative to the virtual stage, an orientation of the virtual light relative to the virtual stage, a hue of virtual light rendered by the virtual light, an intensity of virtual light rendered by the virtual light, or a combination thereof.

7. The system of claim 1, wherein the display system comprises a head mounted display configured to be worn by the user and to overlay the virtual feature onto the backdrop via a transparent screen of the head mounted display.

8. The system of claim 1, wherein the display system comprises one or more projectors configured to project the virtual feature into eyes of the user to overlay the virtual feature onto the backdrop.

9. The system of claim 1, wherein the controller is configured to:
   receive, from an ambient lighting sensor, ambient lighting feedback indicative of ambient lighting conditions surrounding the backdrop; and
   adjust the appearance of the virtual feature to the updated appearance based on the ambient lighting feedback.

10. A method for evaluation of an augmented reality (AR) experience provided to a user, the method comprising:
    overlaying, via a display system, a virtual feature onto a backdrop to enable the user to view the virtual feature overlaid onto the backdrop;
    receiving, from a sensor, feedback indicative of an operational parameter of a physical light configured to illuminate the backdrop;
    receiving, at a controller, additional feedback indicative of a state of a virtual light, wherein the state of the virtual light defines an appearance of the virtual feature;
    adjusting, via the controller, the appearance of the virtual feature to an updated appearance based on the feedback indicative of the operational parameter of the physical light; and
    adjusting, via the controller, the operational parameter of the physical light based on the additional feedback indicative of the state of the virtual light.

11. The method of claim 10, comprising adjusting, via an actuator coupled to the physical light, the operational parameter of the physical light in response to receiving the additional feedback indicative of the state of the virtual light.

12. The method of claim 11, wherein the operational parameter comprises a position of the physical light relative to the backdrop, an orientation of the physical light relative to the backdrop, or both.

13. The method of claim 10, comprising rendering the virtual feature in a virtual stage of a virtual space, wherein the virtual stage corresponds to a physical stage having the backdrop and is dimensionally proportional to the physical stage.

14. The method of claim 10, comprising receiving the additional feedback indicative of the state of the virtual light from a user interface communicatively coupled to the controller.

15. The method of claim 10, comprising:
    associating the physical light with an identifier unique to the physical light, wherein the physical light is a first physical light of a plurality of physical lights configured to illuminate the backdrop and associated with respective identifiers;
    detecting an occurrence of a fault condition in the first physical light; and
    displaying, via the display system, the identifier associated with the first physical light in response to detecting the occurrence.

16. An augmented reality (AR) system, comprising:
    a display system configured to overlay a virtual feature onto an environment viewable by a user;
    a physical light configured to illuminate the environment; and
    a controller communicatively coupled to the display system and the physical light, wherein the controller is configured to:
       render the virtual feature within a virtual space having a virtual light, wherein a state of the virtual light defines an appearance of the virtual feature;
       adjust the state of the virtual light based on feedback indicative of an operational parameter of the physical light; and adjust the operational parameter of the physical light based on additional feedback indicative of the state of the virtual light.

17. The AR system of claim 16, comprising a sensor configured to monitor the operational parameter, wherein the operational parameter comprises a position of the physical light in the environment, an orientation of the physical light in the environment, a hue of light output by the physical light, an intensity of the light output by the physical light, or a combination thereof.

18. The AR system of claim 16, comprising a user interface configured to generate the additional feedback indicative of the state of the virtual light in response to user input at the user interface.

19. The AR system of claim 16, wherein the display system comprises a head mounted display configured to be worn by the user.

20. The AR system of claim 16, wherein the state of the virtual light defines shading, coloring, hue, and/or highlighting of the virtual feature.

* * * * *